(12) United States Patent
Heydel et al.

(10) Patent No.: US 10,174,540 B2
(45) Date of Patent: Jan. 8, 2019

(54) DOMESTIC REFRIGERATION APPLIANCE WITH AN OVERLOAD PROTECTION DEVICE OF AN OPENING ASSISTING DEVICE AND ASSOCIATED METHOD

(71) Applicant: BSH HAUSGERAETE GMBH, Munich (DE)

(72) Inventors: Adolf Heydel, Waldenbuch (DE); Nikolaus Schmidt, Sindelfingen (DE)

(73) Assignee: BSH Hausgeraete GmbH, Munich (DE)

( * ) Notice: Subject to any disclaimer, the term of this patent is extended or adjusted under 35 U.S.C. 154(b) by 287 days.

(21) Appl. No.: 15/135,847

(22) Filed: Apr. 22, 2016

(65) Prior Publication Data

US 2016/0312513 A1    Oct. 27, 2016

(30) Foreign Application Priority Data

Apr. 22, 2015 (DE) ................. 10 2015 207 311

(51) Int. Cl.
*E06B 3/36* (2006.01)
*E05F 15/619* (2015.01)
(Continued)

(52) U.S. Cl.
CPC .......... *E05F 15/619* (2015.01); *E05F 15/611* (2015.01); *E05F 15/614* (2015.01);
(Continued)

(58) Field of Classification Search
CPC ........ E05F 15/619; E05F 15/614; F16D 7/04; F16D 7/048; F16D 7/00; E05B 17/0033;
(Continued)

(56) References Cited

U.S. PATENT DOCUMENTS 4,361,212 A * 11/1982 Bolang .................. F16F 7/121
                                                              188/377
4,566,570 A * 1/1986 Geisthoff ................ F16D 7/048
                                                              192/56.1
(Continued)

FOREIGN PATENT DOCUMENTS

DE    102006061083 A1    6/2008
JP      H11216033 A       8/1999
(Continued)

*Primary Examiner* — Katherine W Mitchell
*Assistant Examiner* — Abe Massad
(74) *Attorney, Agent, or Firm* — Laurence A. Greenberg; Werner H. Stemer; Ralph E. Locher

(57) ABSTRACT

A refrigerator has a heat-insulated carcass which has an inner container with a cool able interior space for storing food, a refrigeration device for cooling the interior space, an electromechanical opening assisting device, and a door leaf mounted to the carcass for opening and closing the interior space. The opening assisting device contains an actuator configured to open the door leaf automatically by displacement of a control body. The actuator has a displaceable base body, a plunger mounted in the base body as the control body and an overload protection device arresting the plunger in the base body. The overload protection device fixes the plunger rigidly in the base body, for as long as an impact force acting on the plunger remains smaller than a trigger force and to release the plunger from the base body as soon as an impact force acting on the plunger exceeds the trigger force.

10 Claims, 3 Drawing Sheets

(51) Int. Cl.
*E05F 15/611* (2015.01)
*E05F 15/614* (2015.01)
*F25D 23/02* (2006.01)
*F16H 19/04* (2006.01)
*H02K 7/00* (2006.01)

(52) U.S. Cl.
CPC ........... *E06B 3/36* (2013.01); *E05Y 2201/434* (2013.01); *E05Y 2900/31* (2013.01); *F16H 19/04* (2013.01); *F25D 23/02* (2013.01); *F25D 23/028* (2013.01); *H02K 7/003* (2013.01)

(58) Field of Classification Search
CPC ........ F25D 25/025; F25D 23/02; F25D 25/02; F25D 23/028
USPC .................................................. 475/263, 265
See application file for complete search history.

(56) References Cited

U.S. PATENT DOCUMENTS

| | | | |
|---|---|---|---|
| 6,202,803 B1* | 3/2001 | Lang | F16D 55/28 188/134 |
| 6,240,797 B1* | 6/2001 | Morishima | F16H 25/2454 188/134 |
| 6,338,536 B1* | 1/2002 | Ueno | E05B 17/0033 312/405 |
| 8,015,890 B2* | 9/2011 | Christensen | F16H 25/2021 192/56.62 |
| 8,454,102 B2* | 6/2013 | Kim | E05F 15/619 312/319.5 |
| 9,062,911 B2 | 6/2015 | Keller et al. | |
| 9,695,624 B2* | 7/2017 | Heydel | H02K 7/116 |
| 9,874,392 B2* | 1/2018 | Kempfle | F25D 23/028 |
| 2014/0306596 A1* | 10/2014 | Linke | E05F 15/611 312/405 |

FOREIGN PATENT DOCUMENTS

| | | |
|---|---|---|
| JP | 2000070060 A | 3/2000 |
| JP | 2001280827 A | 10/2001 |
| JP | 2006200891 A | 8/2006 |

* cited by examiner

DOMESTIC REFRIGERATION APPLIANCE WITH AN OVERLOAD PROTECTION DEVICE OF AN OPENING ASSISTING DEVICE AND ASSOCIATED METHOD

CROSS-REFERENCE TO RELATED APPLICATION

This application claims the priority, under 35 U.S.C. § 119, of German application DE 10 2015 207 311.4, filed Apr. 22, 2015; the prior application is herewith incorporated by reference in its entirety.

BACKGROUND OF THE INVENTION

Field of the Invention

The invention relates to a domestic refrigeration appliance having a heat-insulated carcass which has an inner container with a cool able interior space for storing food, a refrigeration device for cooling the cool able interior space and an electromechanical opening assisting device, as well as a door leaf mounted pivotable relative to the heat-insulated carcass for opening and closing the cool able interior space, or a drawer which in the closed state is pushed into the cool able interior space in order to close it, and in the open state is at least partially withdrawn from the cool able interior space. The electromechanical opening assisting device contains an electromechanical actuator which is configured, on activation, to open the closed door leaf or the closed drawer automatically at least partially by displacement of a control body of the electromechanical opening assisting device.

The invention further relates to a method for operating a domestic refrigeration appliance of this type.

Published, non-prosecuted German patent application DE 10 2006 061 083 A1, corresponding to U.S. Pat. No. 9,062,911, discloses a domestic refrigeration appliance which has a heat-insulated carcass with an inner container. The inner container delimits a cool able interior space. The domestic refrigeration appliance contains a door leaf which is pivotable relative to the carcass to open and close the interior space and a door opening aid which has a control body and an air pressure sensor which is configured to determine an air pressure change within the interior space due to a pushing and/or pulling on the closed door leaf, in order thereupon to open the closed door leaf automatically at least partially by means of the control body.

SUMMARY OF THE INVENTION

It is an object of the invention to provide a domestic refrigeration appliance with an electromechanical opening assisting device for assisted opening of a closed door leaf or a closed drawer which is particularly reliable to operate.

The object of the invention is achieved with a domestic refrigeration appliance having a heat-insulated carcass which has an inner container with a cool able interior space for storing food, a refrigeration device for cooling the cool able interior space and an electromechanical opening assisting device, as well as a door leaf mounted pivotable relative to the heat-insulated carcass for opening and closing the cool able interior space, or a drawer which in the closed state is pushed into the cool able interior space in order to close it, and in the open state is at least partially withdrawn from the cool able interior space. The electromechanical opening assisting device contains an electromechanical actuator which is configured, on activation, to open the closed door leaf or the closed drawer automatically at least partially by displacement of a control body of the electromechanical opening assisting device. The electromechanical actuator contains an automatically displaceable base body, a plunger mounted in the base body as the control body and an overload protection device which arrests the plunger in the base body and is configured to fix the plunger rigidly in the base body, for as long as an impact force acting on the plunger remains smaller than a pre-determined trigger force and to release the plunger from the base body as soon as an impact force acting on the plunger exceeds the trigger force.

A corresponding electromechanical opening assisting device can contain an electromechanical actuator with an electric motor, a drive pinion, a double-toothing crown wheel and a toothed rack, the drive pinion being linked to a motor shaft of the motor and meshing with the input toothing of the double-toothing crown wheel, the output toothing of the double-toothing crown wheel meshing with a toothed rack profile of the toothed rack and the toothed rack being connected to the control body.

In the case of a door leaf, it is preferably mounted pivotable relative to an axis which preferably extends vertically. In addition, or alternatively to the door leaf, the domestic refrigeration appliance according to the invention can have a drawer which, in the closed state, is pushed into the cool able interior space in order to close it and, in the open state, is at least partially withdrawn from the cool able interior space. In such a case, the electromechanical opening assisting device is configured to assist an activation of the electromechanical opening assisting device triggered due to a pushing and/or pulling on the closed drawer to open or to assist the opening of the closed drawer by the electromechanical opening assisting device at least partially.

The refrigeration device is preferably a refrigerant circuit. The refrigerant circuit contains a compressor and, in particular, a condenser connected downstream of the compressor, a throttle device connected downstream of the condenser and an evaporator which is arranged between the throttle device and the compressor.

Preferably mounted on the side of the door leaf or the drawer facing toward the cool able interior space is an elastic magnetic seal which, with the door leaf closed or with the drawer closed, lies sealingly against the heat-insulated carcass. The magnetic seal is elastic so that in the event of pushing on the closed door leaf or on the closed drawer, the door leaf or drawer moves a little in the direction of the cool able interior space, so that the air pressure within the interior space changes. Due to the elastic magnetic seal, in the event of pulling on the closed door leaf or on the closed drawer, the magnetic seal does not detach immediately from the heat-insulated carcass, so that the air pressure within the cool able interior space changes.

Such a change of the air pressure can be recognized automatically, for example, by an air pressure sensor, so that the wish of a person to open the closed door leaf or the closed drawer can be concluded. Thus a control device connected to the air pressure sensor can, for example, automatically activate the electromechanical opening assisting device. However, the electromechanical opening assisting device according to the invention can also be activated in another way, for example, by a button to be operated manually or by other types of sensor which can recognize or at least predictively determine an intention of a person wishing to open the closed door leaf or the closed drawer.

The electromechanical opening assisting device actuates a control body, preferably a plunger which can be moved automatically, for example, by an actuator, from a driven in to a driven out position, in order to open the closed door leaf or the closed drawer at least partially, preferably at least so far that the magnetic seal detaches from the heat-insulated carcass.

In that the electromechanical actuator contains an automatically displaceable base body, a plunger mounted in the base body as the control body and an overload protection device which arrests the plunger in the base body, and is configured to fix the plunger rigidly in the base body for as long as an impact force acting upon the plunger remains smaller than a pre-determined trigger force and to release the plunger from the base body as soon as an impact force acting on the plunger exceeds the trigger force, a type of safety coupling is provided which ensures that in the case of a force exerted on the plunger that would be enough, for example, to destroy the gearing or the motor mechanically. The plunger is separated from the base body so that the plunger can avoid this damaging force and the force is therefore not transferred to components, in particular, to the gearing or the motor. By means of the overload protection device, the opening assisting device is protected against destruction.

In general, the electromechanical opening assisting device can comprise, quite generally, a housing, in particular two housing halves, in which at least the electric motor, the drive pinion, the double-toothing crown wheel, the toothed rack, the at least one rolling body and the control body are arranged or mounted or fastened. One or more of these components can be made of glass fiber-reinforced polyamide (PA-GF).

The toothed rack transfers the linear motion to the control body. The toothed rack is provided on the base body. The base body can have a receptacle into which the control body, in particular the plunger is inserted and locked. The control body, in particular the plunger, can have a cap at its free end. The cap can be, for example, pushed or screwed onto the end of the control body, in particular the plunger. In particular, in the case of a control body or plunger made of a metallic material such as steel, the cap can be made of plastics. The cap touches the door leaf to be opened or the drawer front to be opened on the respective inside thereof, at least during the automatic opening process.

The toothed rack can have a first rolling surface on a toothed rack wall opposite the toothed rack profile on which at least one rolling body, in particular at least one smooth-walled or toothed support roller rolls, the rolling body also being supported, on the side thereof opposite the first rolling surface, against the housing.

The electric motor can be a permanent-field alternating current synchronous motor in all the embodiment variants, the motor being operated, in particular, at a rotary speed of between 500 and 1,000 rotations per minute, in particular at a rotary speed of between 700 and 800 rotations per minute.

For the drive, a BLDC motor with an extremely flat construction and a torque of approximately 0.27 Nm at approximately 780 rpm can be used in order to be able to provide high torques at the lowest possible rotary speeds. Sinusoidal phase voltages/currents provide for a largely harmonic-free torque pattern in the drive.

The overload protection device can have a locking device connected to the base body and a counter-locking device corresponding to the locking device and connected to the plunger, wherein the locking device and the counter-locking device are configured to come into form-fitting mutual engagement during proper use of the electromechanical opening assisting device such that a drive force generated by the electromechanical actuator is transferable to the plunger and, on exceeding the pre-determined trigger force, the locking device and the counter-locking device are to be brought out of engagement by means of an impact force exceeding the pre-determined trigger force such that the plunger detaches from its rigid arrangement relative to the base body and becomes displaceable relative to the base body.

The overload protection device, in particular the locking device and the counter-locking device can thus be configured to maintain a rigid connection of the plunger and the base body for as long as the forces acting on the plunger give no cause to fear destruction of components of the opening assisting device. Depending on the design of the opening assisting device, a trigger force can be defined and pre-set, on exceeding which a destruction of components of the opening assisting device is to be feared. The overload protection device, in particular the locking device and the counter-locking device are thus configured to release the rigid connection of the plunger and the base body, i.e. to free or to make mobile the plunger as soon as the trigger force is exceeded.

The locking device can have at least one, in particular, two elastic locking hooks which are arranged mutually opposed and which, in an arrangement characterizing the proper use, engage behind at least one locking surface of the counter-locking device, the elastic locking hooks being configured, on reaching the pre-determined trigger force, to bend such that the at least one locking surface of the counter-locking device is released. If the locking surface of the counter-locking device has been released, then no further rigid connection of the plunger and the base body exists, so that the plunger can move relative to the base body and, in particular, by means of its movement the plunger can avoid the impact force which exceeds the trigger force.

The plunger can have, in particular, a circular cylindrical shaft, the base body can have a receptacle with an inner mantle wall matched to the outer mantle wall of the shaft and the shaft can be mounted in the receptacle linearly displaceable in the direction of its longitudinal extent when the overload protection device has released the plunger from the base body.

The plunger can have, in particular, a circular cylindrical shaft, the base body can have a receptacle with an inner mantle wall matched to the outer mantle wall of the shaft and the shaft is firmly held in the receptacle when the overload protection device, in an arrangement characterizing the proper use, fixes the plunger on the base body.

The plunger, in particular the shaft of the plunger can preferably have, on an end opposite to the impact end of the plunger or the shaft, a pushed on or screwed on locking block which has the at least one locking surface of the counter-locking device.

In a triggered state of the overload protection device, this locking block then extends outwardly beyond the contour of the base body. In a basic position of the base body, the locking block which projects beyond the contour of the base body can lie against or make contact with a contact surface, for example, an inner wall of the housing of the opening assisting device. If the locking block is contained, in its non-triggered state, entirely within the contour of the base body, then in the basic position, the locking block cannot however lie against or make contact with the stop surface, such as for example an inner wall of the housing of the opening assisting device. Contact of the triggered locking block can be used to be able to detect the triggered state of the overload protection device, in particular to be able to detect it automatically, for example by a monitoring of a current rise in the motor which drives the base body or the plunger automatically. Alternatively or additionally, the motor can also be driven such that in a triggered state, in that the locking block projects outwardly beyond the contour of the base body, the base body is driven further in the direction of the stop surface or the inner wall of the housing, so that the locking block can spring back again into its non-triggered position within the base body where the locking block lies entirely within the contour of the base body and the plunger is now again coupled or connected rigidly to the base body.

In all embodiments, the base body and/or the locking block can be made of polyether ether ketone (PEEK). Through the use of polyether ether ketone (PEEK), a particularly stable modulus of elasticity can be achieved which is particularly largely independent, for example, of temperature changes or aging effects. This means that the trigger force of the overload protection device can be maintained particularly exactly.

The object of the invention is further solved by a method for operating a domestic refrigeration appliance as described. The method includes the following steps of:

a) electrically powered, automatic movement of the base body from a position activating the door leaf or the drawer into a basic position in which the overload protection device, in its non-triggered state, has a distance from a stop surface of the electromechanical opening assisting device, in particular an inner wall of a housing of the electromechanical opening assisting device and, in its triggered state, lies against the stop surface of the electromechanical opening assisting device, in particular against the inner wall of the housing of the electromechanical opening assisting device;

b) automatic monitoring of a motor current of the electromechanical actuator of the electromechanical opening assisting device; and c) automatic signaling of the triggering of the overload protection device when, during the automatic monitoring of the motor current of the motor in the case of an electrically powered automatic movement of the base body into the basic position in the triggered state, a raised current uptake by the motor is determined as compared with an electrically powered automatic movement of the base body into the basic position in the non-triggered state.

Based on an automatic signaling of the triggering of the overload protection device, the control device of the domestic refrigeration appliance can, for example, indicate a fault on the domestic refrigeration appliance, particularly optically or acoustically, for example with a warning lamp. Alternatively or additionally, the control device of the domestic refrigeration appliance can automatically switch off the opening assisting device electrically. Alternatively or additionally, the control device of the domestic refrigeration appliance can control the opening assisting device automatically such that in a triggered state, in that the locking block projects outwardly beyond the contour of the base body, the base body is driven further in the direction of the stop surface or the inner wall of the housing, so that the locking block can spring back again into its non-triggered position within the base body where the locking block lies entirely within the contour of the base body and the plunger is now again coupled or connected rigidly to the base body.

Summarizing, in order to prevent gearing damage through improper overloading, a mechanical trigger mechanism can be integrated into the toothed rack of the drive unit. If, for example, the user pushes too strongly against an open door, a mechanical overload protection of this type is triggered.

The resetting of the overload protection can take place by automatic or manual resetting of the plunger wherein the toothed rack and the plunger rod can lock into one another again and restore the force-fit via a special coupling element. The plunger rod can carry a locking body. The locking body has a special profile as the counter-bearing to the locking lugs of the spring elements. The spring elements are part of the toothed rack which can be configured as a glass fiber-reinforced plastics body. It is also possible to integrate the locking body or the locking profile into the toothed rack body and to fasten the elastic part on the plunger rod. By means of optional adjusting elements, the spring force and thus the trigger force can be adjusted more precisely.

According to a preferred embodiment of the domestic refrigeration appliance according to the invention, the assisting device has a housing within which substantially all the components of the assisting device are arranged. Preferably, in particular, all the electrical and any mechanical components necessary for the operation of the assisting device are arranged within the housing, possibly except for an electrical power supply. A control body is preferably also arranged in the housing, but then projects at least partially out of the housing at least in its driven out position. The housing of the assisting device is preferably made of plastics, in particular glass fiber-reinforced polyamide (PA-GF).

Other features which are considered as characteristic for the invention are set forth in the appended claims.

Although the invention is illustrated and described herein as embodied in a domestic refrigeration appliance with an overload protection device of an opening assisting device and associated method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
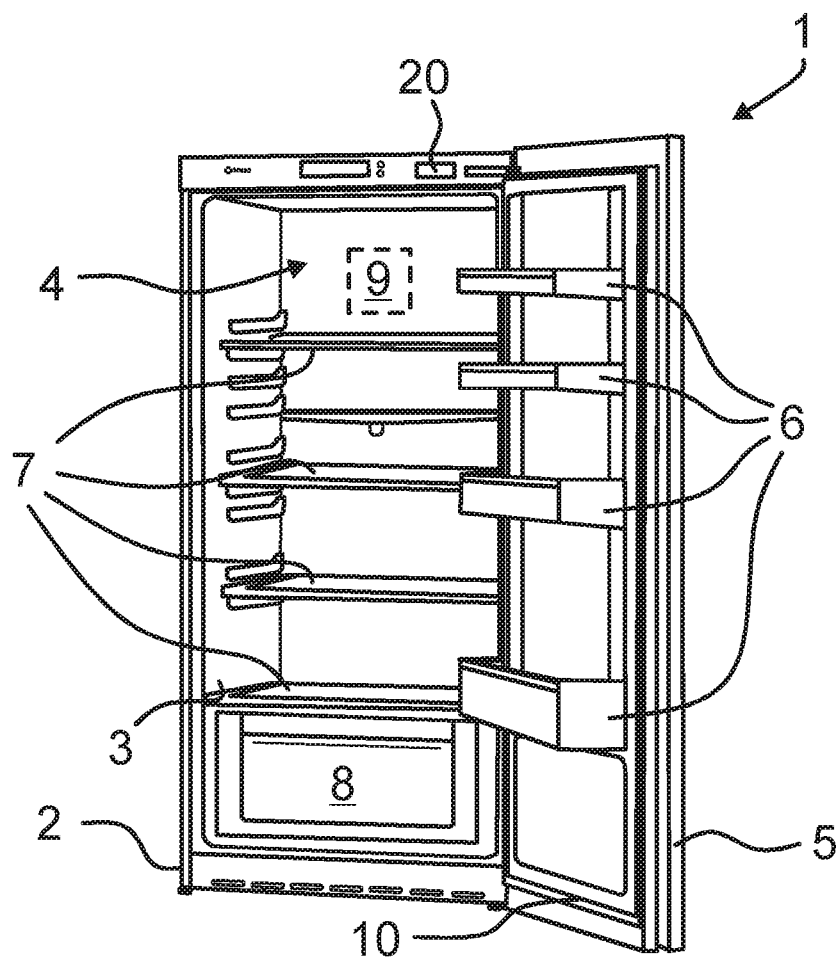
FIG. 1 is diagrammatic, perspective view of a domestic refrigeration appliance with a door leaf and an electromechanical opening assisting device for opening the door leaf according to the invention.

Referring now to the figures of the drawings in detail and first, particularly to FIG. 1 thereof, there is shown, in a perspective view, a domestic refrigeration appliance 1 which contains a heat-insulated carcass 2 with an inner container 3 which delimits a cool able interior space 4. The cool able interior space 4 is provided for storing non-illustrated food.

In the case of the present exemplary embodiment, the domestic refrigeration appliance 1 has a pivotable door leaf 5 for closing the cool able interior space 4. The door leaf is mounted, in particular, pivotable relative to a vertically extending axis. With the door leaf 5 open as shown in FIG. 1, the cool able interior space 4 is accessible.

Arranged on the side of the door leaf 5 facing toward the cool able interior space 4 in the case of the present exemplary embodiment are a plurality of door storage units 6 for storing food. Arranged in the cool able interior space 4 are, in particular, a plurality of shelves 7 for storing food and arranged, in particular, in the lower region of the cool able interior space 4 is a drawer 8 in which, also, food can be stored.

The domestic refrigeration appliance 1 has a refrigeration device configured, in particular, as a refrigerant circuit for cooling the cool able interior space 4. The refrigerant circuit has, in particular, a compressor, a condenser connected downstream of the compressor, a throttle device which is configured, in particular, as a throttle pipe or capillary pipe connected downstream of the condenser, and an evaporator which is arranged between the throttle device and the compressor. The compressor is preferably arranged within a mechanism chamber of the domestic refrigeration appliance 1, which is arranged, in particular, behind the drawer 8.

In the case of the present exemplary embodiment, the domestic refrigeration appliance 1 has an electronic control device 9 which is configured to control the refrigeration device, in particular the compressor of the refrigerant circuit in a manner that is commonly known to persons skilled in the art, such that the cool able interior space 4 has approximately a pre-determined or pre-determinable target temperature. The electronic control device 9 is preferably configured such that it regulates the temperature of the cool able interior space 4. In order, if required, to obtain the target temperature of the cool able interior space 4, the domestic refrigeration appliance 1 can have at least one temperature sensor (not shown in detail) which is connected to the electronic control device 9.

Figure 2:
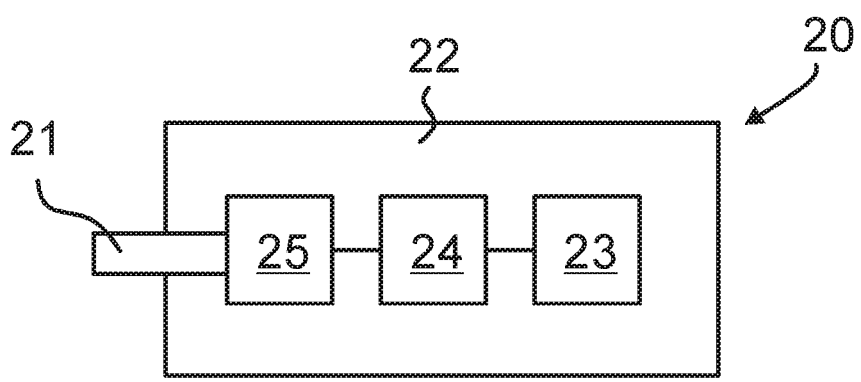
FIG. 2 is an illustration of a principle of the electromechanical opening assisting device.

The domestic refrigeration appliance 1 also has an electromechanical opening assisting device 20 which is configured at least to assist an opening of the closed door leaf 5. FIG. 2 shows an illustration of the principle of the electromechanical opening assisting device 20.

The electromechanical opening assisting device 20 is fastened, for example, in or on the carcass 2 and has a control body 21, for example, a plunger which can be moved automatically by an actuator 22 of the electromechanical opening assisting device 20 from a driven in to a driven out position. In its driven in position, the plunger 21 permits closing of the door leaf 5 or the plunger 21 is pushed, on closing the door leaf 5, into its driven in position. The actuator 22 has an electric motor 23, a double-toothing crown wheel 24 and a toothed rack 25.

In the case of the present exemplary embodiment, the domestic refrigeration appliance 1 has a magnetic seal 10 fastened on the side of the door leaf 5 facing toward the cool able interior space 4, the magnetic seal lying, with the door leaf 5 closed, against the front face of the carcass 2. The magnetic seal 10 is elastic so that in the event of pushing on the closed door leaf 5, it moves a little in the direction of the cool able interior space 4, so that the air pressure within the cool able interior space 4 changes. Due to the elastic magnetic seal 10, in the event of pulling on the closed door leaf 5, the magnetic seal 10 does not detach immediately from the carcass 2, so that the air pressure within the cool able interior space 4 likewise changes.

In the case of the present exemplary embodiment, the electromechanical opening assisting device 20 is configured such that it recognizes the wish of a person to open the door leaf 5 as soon as the person pulls or pushes on the closed door leaf 5. Thereupon, the actuator 22 automatically moves the plunger from its driven in position into its driven out position. During this movement, the plunger 21 pushes the door leaf 5 open at least so far that the magnetic seal 10 detaches from the carcass 2 so that the person can more easily open the door leaf 5 completely.

For example, based on a measurement and evaluation of the change in the air pressure within the cool able interior space 4, a pulling or pushing on the door leaf 5 and therefore the wish of a person to open the closed door leaf 5 can thus be deduced. Accordingly, a sensor device which is per se known to a person skilled in the art and a corresponding control device can be provided in order to activate the electromechanical actuator 22 when the wish of a person to open the closed door leaf 5 is recognized so that the closed door leaf 5 or the closed drawer is opened automatically at least partially by displacement of the control body 21 by the electromechanical actuator 22.

The domestic refrigeration appliance 1 can also have a drawer which is at least partially withdraw able from the cool able interior space 4 and is push able into the cool able interior space 4. In the pushed in state, this drawer closes the cool able interior space 4. If this drawer is at least partially withdrawn from the cool able interior space 4, then it is opened. The electromechanical opening assisting device 20 can also be provided to recognize the wish to open the drawer and accordingly to open the drawer automatically at least partially.

In the case of the present exemplary embodiment, the electromechanical opening assisting device 20 is configured such that it recognizes the wish of a person to open this drawer as soon as the person pulls or pushes on the closed drawer. Thereupon, the actuator 22 automatically moves the plunger from its driven in position into its driven out position. During this movement, the plunger pushes the drawer open at least so far out of the cool able interior space 4 that a magnetic seal of the drawer detaches from the carcass 2 so that the person can more easily open the drawer completely.

The electromechanical actuator 22 has the electric motor 23, a drive pinion 27, the double-toothing crown wheel 24 and the toothed rack 25. The drive pinion 27 is connected to a motor shaft 28 of the motor 23. The drive pinion 27 meshes, as shown particularly in FIG. 3, with an input toothing 24a of the double-toothing crown wheel 24. The double-toothing crown wheel 24 also has an output toothing 24b which engages, as shown particularly in FIG. 4, with a toothed rack profile 25a of the toothed rack 25. The toothed rack 25 is connected to the control body 21.

Figure 4:
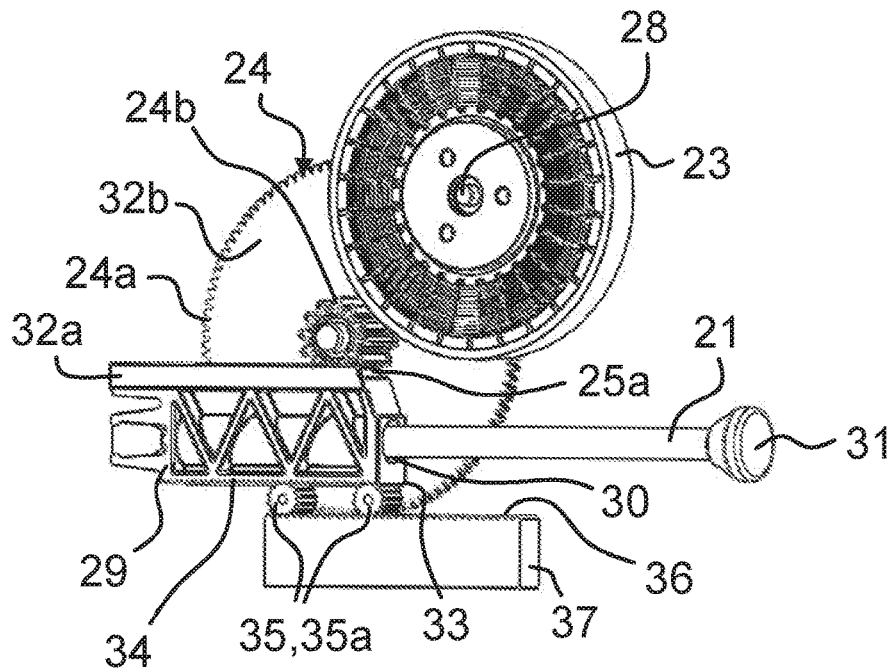
FIG. 4 is a perspective view of the electromechanical opening assisting device of FIG. 3 with a removed housing.

In the exemplary embodiment, for example, as shown in FIG. 4, the toothed rack 25 is provided on a base body 29. The base body 29 has a receptacle 30 into which the control body 21, in particular the plunger is inserted and locked. The control body 21, in particular the plunger, has a cap 31 at its free end. The cap 31 can be, for example, pushed or screwed onto the end of the control body 21, in particular the plunger. In particular, in the case of a control body 21 or plunger made of a metallic material such as steel, the cap 31 can be made of plastics. The cap 31 touches the door leaf 5 to be opened or the drawer front to be opened on the respective inside thereof, at least during the automatic opening process. The base body 29 also has a first cheek 32a which supports the output toothing 24b of the double-toothing crown wheel 24 axially.

Figure 3:
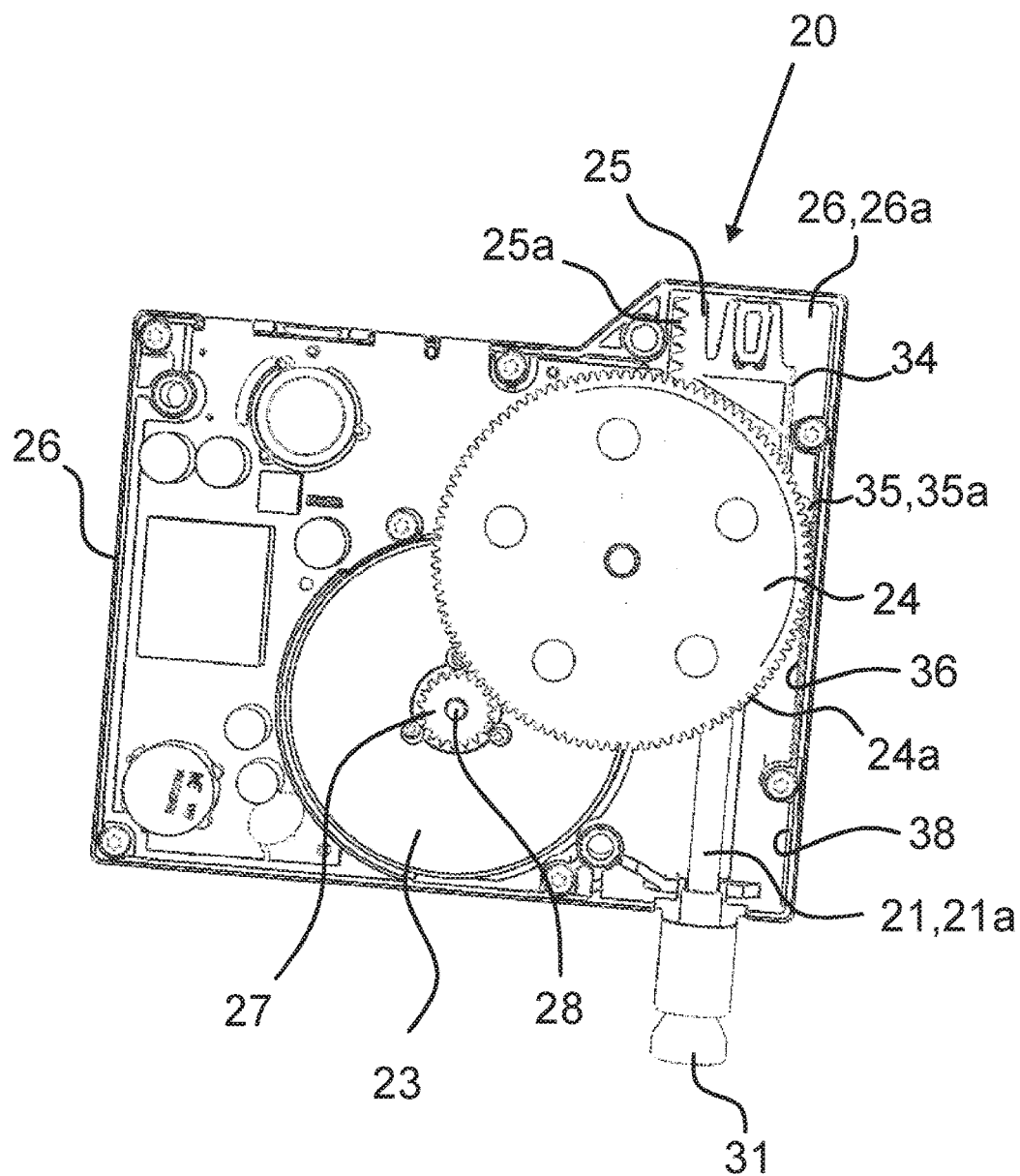
FIG. 3 is a plan view of an embodiment of the electromechanical opening assisting device.

On a toothed rack wall 33 of the toothed rack 25 or of a base body 29 lying opposite to the toothed rack profile 25a, the base body 29 has a rolling surface 34, in particular in the form of a wave profile. In the case of the present exemplary embodiment, two rolling bodies 35 in the form of toothed support rollers 35a roll along the rolling surface 34. In the case of the present exemplary embodiment, the toothed support rollers 35a each have a wave profile. FIG. 3 shows that the rolling bodies 35, in particular the support rollers 35a are supported on a side of the rolling bodies 35 or the support rollers 35a lying opposing the rolling surface 34 by a fixed second rolling surface 36 against the housing 26. The second rolling surface 36 can be provided, as shown in FIG. 4, on a separate support body 37 which is fastened on the housing 26 or constructed in one part, as shown in FIG. 3, directly with an inner wall 38 of the housing 26.

Figure 5:
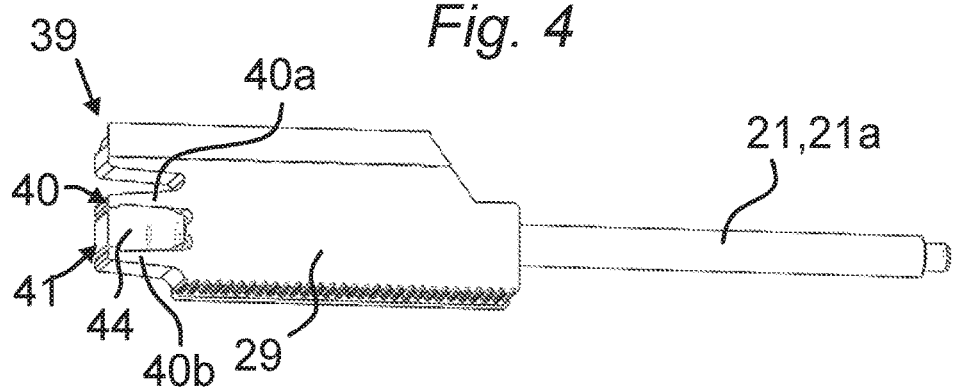
FIG. 5 is a perspective view of an overload protection device from the electromechanical opening assisting device of FIG. 4 in a non-triggered arrangement.
Figure 6:
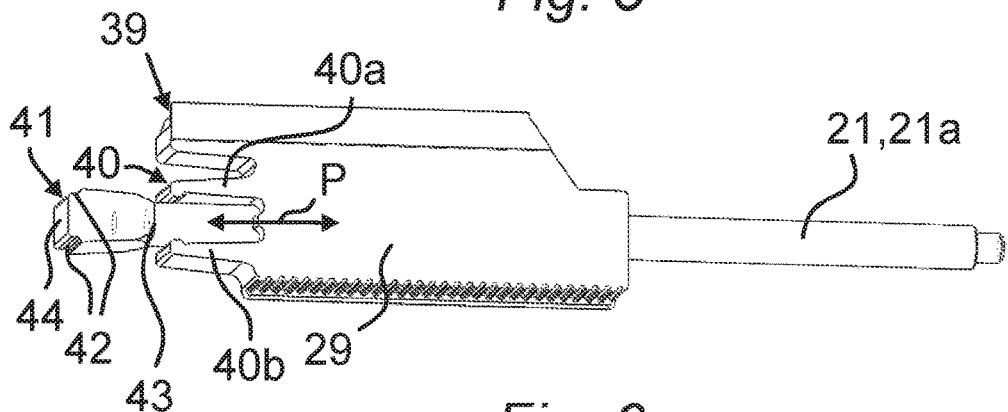
FIG. 6 is a perspective view of the overload protection device from the electromechanical opening assisting device of FIG. 4 in a triggered arrangement.

As FIGS. 5 and 6, in particular, show, the overload protection device 39 has a locking device 40 connected to the base body 29 and a counter-locking device 41 corresponding to the locking device 40 connected to the plunger 21a. The locking device 40 and the counter-locking device 41 are configured to come into form-fitting mutual engagement during proper use of the electromechanical opening assisting device 20, as shown in FIG. 5, such that a drive force generated by the electromechanical actuator 22 is transferable to the plunger 21a and, on exceeding the pre-determined trigger force, the locking device 40 and the counter-locking device 41 are to be brought out of engagement by an impact force exceeding the pre-determined trigger force, as shown in FIG. 6, such that the plunger 21a detaches from its rigid arrangement relative to the base body 29 and becomes displaceable relative to the base body 29. The displace ability is indicated in FIG. 6 by the arrow P.

In the case of the present exemplary embodiment, the locking device 40 has two elastic locking hooks 40a, 40b arranged mutually opposed which, in an arrangement characterizing the proper use (FIG. 5), engage behind at least one locking surface 42 of the counter-locking device 41, the elastic locking hooks 40a, 40b being configured, on reaching the pre-determined trigger force, to bend such that the at least one locking surface 42 of the counter-locking device 41 is released, as shown in FIG. 6.

The plunger 21a, in particular, the shaft of the plunger 21a, preferably has, on a front end 43 opposite to the impact end of the plunger 21a or the shaft, a pushed on or screwed on locking block 44 which has the at least one or, in the case of the present exemplary embodiment, two locking surfaces 42 of the counter-locking device 41.

The following is a summary list of reference numerals and the corresponding structure used in the above description of the invention:

1 Domestic refrigeration appliance
2 Carcass
3 Inner container
4 Cool able interior space
5 Door leaf
6 Door storage unit
7 Shelf
8 Drawer
9 Electronic control device
10 Magnetic seal
20 Electromechanical opening assisting device
21 Control body
21a Plunger
22 Electromechanical actuator
23 Motor
23a Stator
23b Rotor
24 Double-toothing crown wheel
24a Input toothing
24b Output toothing
25 Toothed rack
25a Toothed rack profile
24 Housing
26a First housing half
26b Second housing half
27 Drive pinion
28 Motor shaft
29 Base body
30 Receptacle
31 Cap
32a First cheek
32b Second cheek
33 Toothed rack wall
34 First rolling surface
35 Rolling body
35a Support rollers
36 Second rolling surface
37 Support body
38 Inner wall
39 Overload protection device
40 Locking means
40a, 40b Locking hooks
41 Counter-locking means
42 Locking surface
43 Front end
44 Locking block

The invention claimed is:

1. A domestic refrigeration appliance, comprising:
a heat-insulated carcass having an inner container with a cool able interior space for storing food;
a refrigeration device provided for cooling said cool able interior space;
an element selected from the group consisting of:
a door leaf mounted pivotable relative to said heat-insulated carcass for opening and closing said cool able interior space; and
a drawer which in a closed state is pushed into said cool able interior space in order to close said drawer, and in an open state is at least partially withdrawn from said cool able interior space; and
an electromechanical opening assisting device having a control body with a plunger and an electromechanical actuator which is configured, on activation thereof, to open said closed door leaf or said closed drawer automatically at least partially by displacement of said control body of said electromechanical opening assisting device, said electromechanical actuator having an automatically displaceable base body, said plunger mounted in said base body and an arresting overload protection device which arrests said plunger in said base body and is configured to fix said plunger rigidly in said base body, for as long as an impact force acting on said plunger remains smaller than a pre-determined trigger force and to release said plunger from said base body as soon as the impact force acting on said plunger exceeds the pre-determined trigger force.

2. The domestic refrigeration appliance according to claim 1, wherein said arresting overload protection device has a locking device connected to said base body and a counter-locking device corresponding to said locking device and connected to said plunger, said locking device and said counter-locking device are configured to come into form-fitting mutual engagement during proper use of said electromechanical opening assisting device such that a drive force generated by said electromechanical actuator is transferable to said plunger and, on exceeding the pre-determined trigger force, said locking device and said counter-locking device are to be brought out of engagement by means of the impact force exceeding the pre-determined trigger force such that said plunger detaches from its rigid arrangement relative to said base body and becomes displaceable relative to said base body.

3. The domestic refrigeration appliance according to claim 2, wherein said locking device has two elastic locking hooks disposed spaced from each other and which, in an arrangement characterizing the proper use, engage behind at least one locking surface of said counter-locking device, said elastic locking hooks being configured, on reaching the pre-determined trigger force, to bend such that said at least one locking surface of said counter-locking device is released.

4. The domestic refrigeration appliance according to claim 1, wherein:
said plunger has a circular cylindrical shaft and an outer mantle wall; and
said base body has a receptacle with an inner mantle wall matched to said outer mantle wall of said circular cylindrical shaft and said circular cylindrical shaft is mounted in said receptacle linearly displaceable in a longitudinal extent when said arresting overload protection device has released said plunger from said base body.

5. The domestic refrigeration appliance according to claim 1, wherein:
said plunger has a circular cylindrical shaft and an outer mantle wall;
said base body has a receptacle with an inner mantle wall matched to said outer mantle wall of said circular cylindrical shaft and said circular cylindrical shaft is firmly held in said receptacle when in a configuration characterizing the proper use; and
said arresting overload protection device fixes said plunger on said base body.

6. The domestic refrigeration appliance according to claim 3, wherein:
said plunger has a shaft; and
said counter-locking device has a locking block carrying said at least one locking surface, said locking block being one of screwed on or pushed on a front end of said shaft, said front end being opposite to an impact end of said plunger.

7. The domestic refrigeration appliance according to claim 1, wherein said base body is made of polyether ether ketone.

8. The domestic refrigeration appliance according to claim 1, wherein:
said electromechanical actuator contains an electric motor having a motor shaft, a drive pinion, a double-toothing crown wheel with input toothing and a toothed rack with a toothed rack profile, said drive pinion being connected to said motor shaft of said electric motor and meshing with said input toothing of said double-toothing crown wheel;
said double-toothing crown wheel has output toothing meshing with said toothed rack profile of said toothed rack; and
said toothed rack being connected to said control body by means of said base body.

9. A method for operating the domestic refrigeration appliance according to claim 1, the method comprising the steps of:
electrically powering an automatic movement of the base body from a position activating the door leaf or the drawer into a basic position in which the overload protection device, in a non-triggered state, is spaced from a stop surface of the electromechanical opening assisting device and, in a triggered state of the overload protection device, the overload protection device lies against the stop surface of the electromechanical opening assisting device;
automatic monitoring of a motor current of a motor of the electromechanical actuator of the electromechanical opening assisting device; and
automatic signaling of a triggering of the overload protection device when, during the automatic monitoring of the motor current of the motor in a case of an electrically powered automatic movement of the base body into the basic position in the triggered state, a raised current uptake by the motor is determined as compared with an electrically powered automatic movement of the base body into the basic position in the non-triggered state.

10. The method according to claim 9, wherein the stop surface of the electromechanical opening assisting device is an inner wall of a housing of the electromechanical opening assisting device.

* * * * *